United States Patent
Gjovik et al.

(10) Patent No.: US 11,884,016 B2
(45) Date of Patent: Jan. 30, 2024

(54) X-ARM CARRIAGE ASSEMBLY

(71) Applicant: Essentium, Inc., Pflugerville, TX (US)

(72) Inventors: Erik John Gjovik, Aliso Viejo, CA (US); William Jack MacNeish, III, Newport Beach, CA (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 365 days.

(21) Appl. No.: 17/026,465

(22) Filed: Sep. 21, 2020

(65) Prior Publication Data
US 2022/0088870 A1   Mar. 24, 2022

(51) Int. Cl.
| | |
|---|---|
| *B29C 64/25* | (2017.01) |
| *B29C 64/236* | (2017.01) |
| *B29C 64/386* | (2017.01) |
| *B29C 64/209* | (2017.01) |

(Continued)

(52) U.S. Cl.
CPC ............ *B29C 64/25* (2017.08); *B29C 64/209* (2017.08); *B29C 64/236* (2017.08); *B29C 64/386* (2017.08); *B33Y 30/00* (2014.12); *B33Y 50/00* (2014.12)

(58) Field of Classification Search
CPC ....... B33Y 50/00; B33Y 30/00; B29C 64/236; B29C 64/209; B29C 64/386; B29C 64/25
See application file for complete search history.

(56) References Cited

U.S. PATENT DOCUMENTS

| | | | |
|---|---|---|---|
| 5,606,256 A | 2/1997 | Takei | |
| 6,191,507 B1 * | 2/2001 | Peltier | .............. G01D 5/2451 |
| | | | 318/135 |
| 2007/0170140 A1 | 7/2007 | Guanekar | |

(Continued)

FOREIGN PATENT DOCUMENTS

| | | |
|---|---|---|
| CN | 102263475 A | 11/2011 |
| CN | 111628624 A | 9/2020 |

(Continued)

OTHER PUBLICATIONS

International Searching Authority. International Search Report and Written Opinion for PCT Applicationno. PCT/US2021/051041, dated Dec. 27, 2021.

(Continued)

*Primary Examiner* — Larry W Thrower
(74) *Attorney, Agent, or Firm* — Vivacqua Crane, PLLC

(57) ABSTRACT

An X-arm carriage assembly for an additive manufacturing machine includes a magnet frame, a frame plate, a top plate and a bottom plate that define a rectangular shaped tube structure, first and second support brackets attached to first and second distal ends of the rectangular shaped tube structure to support the X-arm carriage assembly for movement along an x-axis, an encoder strip, a top linear rail mounted and a bottom linear rail adapted to moveably support a print head carriage on the X-arm carriage assembly along a y-axis, a longitudinal slot formed within the magnet frame, and a linear motor magnet track mounted onto the magnet frame in alignment with the longitudinal slot and extending longitudinally along the magnet frame, the linear motor magnet track including one of a single magnet and a plurality of magnets mounted adjacent one another.

27 Claims, 2 Drawing Sheets

(51) Int. Cl.
    *B33Y 50/00*           (2015.01)
    *B33Y 30/00*           (2015.01)

(56) References Cited

U.S. PATENT DOCUMENTS

| | | |
|---|---|---|
| 2010/0133925 A1 | 6/2010 | Finkbeiner et al. |
| 2011/0291496 A1 | 12/2011 | Bobelis |
| 2019/0210283 A1 | 7/2019 | Rouse |

FOREIGN PATENT DOCUMENTS

| | | | |
|---|---|---|---|
| TW | 200738396 A | 10/2007 | |
| WO | 2008098535 A1 | 8/2008 | |
| WO | WO-2008098535 A1 * | 8/2008 | ............. B65G 25/04 |

OTHER PUBLICATIONS

International Searching Authority. International Preliminary Report on Patentability for PCT Application No. PCT/US2021/051041, dated Mar. 21, 2023, pp. 1-6.

Taiwanese Patent Office. Taiwanese Search Report for Taiwanese Application No. 110134903, dated May 4, 2022, pp. 1-7.

\* cited by examiner

X-ARM CARRIAGE ASSEMBLY

The present disclosure relates to an x-arm carriage for an additive manufacturing machine.

A typical additive manufacturing machine includes a printing head, a three-dimensional object or part build table, a supporting structure for the build table, such as a Cartesian gantry to allow the build table to move up and down along a Z-axis, and a structure that supports the print head. A three dimensional object or part is initiated and built upon the build table as a filament passes through the print head, softens or melts in the print head, and is deposited on the build table or onto a previous layer of the three dimensional part. The build table is capable of moving up and down along a z-axis to allow successive layers of the three-dimensional part to be placed. The print head is capable of movement along the x-axis and the y-axis, or a combination of these directions to create the two-dimensional shape of each layer.

Various robotic arms and moving gantry structures have been used to provide for movement of the print head within the additive manufacturing machine. An important aspect of the additive manufacturing machine is the ability to accurately position the print head and precisely move the print head during printing to create intricate and detailed shapes. Another important aspect of the additive manufacturing machine is the overall weight and size of the structure used to provide support and movement of the print head within the additive manufacturing machine.

Thus, while current additive manufacturing machines achieve their intended purpose, there is a need for a new and improved additive manufacturing machine that incorporates an X-arm carriage assembly that provides accurate movement and positioning of the print head and reduces overall size and weight of the additive manufacturing machine.

SUMMARY

According to several aspects of the present disclosure, an X-arm carriage assembly for an additive manufacturing machine includes a vertically oriented magnet frame, a first support bracket attached to a first distal end of the magnet frame and a second support bracket attached to a second distal end of the magnet frame, the first and second support bracket adapted to support the X-arm carriage assembly within an additive manufacturing machine for movement within the additive manufacturing machine along an x-axis, an encoder strip mounted onto a first side of the magnet frame adjacent a top edge of the magnet frame and extending longitudinally along the magnet frame, a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support a print head carriage on the X-arm carriage along a y-axis, a longitudinal slot formed within the magnet frame between the top linear rail and the bottom linear rail, and a linear motor magnet track mounted onto a second side of the magnet frame in alignment with the longitudinal slot and extending longitudinally along the magnet frame.

According to another aspect, the linear motor magnet track includes a single magnet.

According to another aspect, the linear motor magnet track includes a plurality of magnets mounted adjacent one another to the second side of the magnet frame.

According to another aspect, the X-arm carriage assembly further includes a top plate, a bottom plate and a frame plate, the frame plate oriented vertically, parallel to and spaced from the second side of the magnet frame, the top plate extending horizontally between the magnet frame and the frame plate, adjacent a top edge of the frame plate, and the bottom plate extending horizontally between the magnet frame and the frame plate, adjacent a bottom edge of the frame plate, parallel to and spaced from the top plate.

According to another aspect, the magnet frame, the top plate, the frame plate and the bottom plate are made from aluminum.

According to another aspect, the frame plate includes a plurality of openings formed therein.

According to another aspect, the magnet frame, the top plate, the frame plate and the bottom plate define a rectangular shaped tube structure extending between the first and second support brackets.

According to another aspect, the X-arm carriage further including a reinforcement insert positioned within the rectangular shaped tube structure defined by the magnet frame, the top plate, the frame plate and the bottom plate.

According to another aspect the reinforcement insert is held in place by friction between the reinforcement insert and the magnet frame, the top plate, the frame plate and the bottom plate.

According to another aspect, the reinforcement insert is held in place by one of clamping or bolting to the rectangular shaped tube structure defined by the magnet frame, the top plate, the frame plate and the bottom plate.

According to another aspect, the reinforcement insert is made from a composite material.

According to another aspect, the reinforcement insert is made from carbon fiber.

According to another aspect, the linear motor magnet track is adapted to operationally engage a single sided linear motor of a print head carriage supported on the top and bottom linear rails.

According to another aspect, the encoder strip is adapted to read an encoder on a print head carriage supported on the top and bottom linear rails to detect the position of the print head carriage on the X-arm carriage.

According to several aspects of the present disclosure, an X-arm carriage assembly for an additive manufacturing machine includes a vertically oriented magnet frame, a frame plate oriented vertically, parallel to and spaced from a second side of the magnet frame and including a plurality of openings formed therein, a top plate extending horizontally between the magnet frame and the frame plate, adjacent a top edge of the frame plate, a bottom plate extending horizontally between the magnet frame and the frame plate, adjacent a bottom edge of the frame plate, parallel to and spaced from the top plate, the magnet frame, the top plate, the frame plate and a bottom plate defining a rectangular shaped tube structure, a first support bracket attached to a first distal end of the rectangular shaped tube structure and a second support bracket attached to a second distal end of the rectangular shaped tube structure, the first and second support bracket adapted to support the X-arm carriage assembly within an additive manufacturing machine for movement within the additive manufacturing machine along an x-axis, an encoder strip mounted onto a first side of the magnet frame adjacent a top edge of the magnet frame and extending longitudinally along the magnet frame, a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support a print head carriage on the X-arm carriage along a y-axis, a longitudinal slot formed within the magnet frame between the top linear rail and the bottom linear rail, and a linear motor magnet track mounted onto the second side of the magnet frame in alignment with the longitudinal slot and extending longitudinally along the magnet frame, the linear motor magnet track including one of a single magnet and a plurality of magnets mounted adjacent one another.

According to another aspect, the magnet frame, the top plate, the frame plate and the bottom plate are made from aluminum.

According to another aspect, the X-arm carriage assembly further includes a reinforcement insert positioned within the rectangular shaped tube structure defined by the magnet frame, the top plate, the frame plate and the bottom plate.

According to another aspect, the reinforcement insert is held in place by friction between the reinforcement insert and the magnet frame, the top plate, the frame plate and the bottom plate.

According to another aspect, the reinforcement insert is held in place by one of clamping or bolting to the rectangular shaped tube structure defined by the magnet frame, the top plate, the frame plate and the bottom plate.

According to another aspect, the reinforcement insert is made from a composite material.

According to another aspect, the reinforcement insert is made from carbon fiber.

According to another aspect, the linear motor magnet track is adapted to operationally engage a single sided linear motor of a print head carriage supported on the top and bottom linear rails and the encoder strip is adapted to read an encoder on the print head carriage supported on the top and bottom linear rails to detect the position of the print head carriage on the X-arm carriage.

According to several aspects of the present disclosure, an X-arm carriage assembly for an additive manufacturing machine includes a vertically oriented magnet frame, a frame plate oriented vertically, parallel to and spaced from a second side of the magnet frame and including a plurality of openings formed therein, a top plate extending horizontally between the magnet frame and the frame plate, adjacent a top edge of the frame plate, a bottom plate extending horizontally between the magnet frame and the frame plate, adjacent a bottom edge of the frame plate, parallel to and spaced from the top plate, the magnet frame, the top plate, the frame plate and the bottom plate defining a rectangular shaped tube structure, a reinforcement insert positioned within the rectangular shaped tube structure, a first support bracket attached to a first distal end of the rectangular shaped tube structure and a second support bracket attached to a second distal end of the rectangular shaped tube structure, the first and second support bracket adapted to support the X-arm carriage assembly within an additive manufacturing machine for movement within the additive manufacturing machine along an x-axis, an encoder strip mounted onto a first side of the magnet frame adjacent a top edge of the magnet frame and extending longitudinally along the magnet frame, the encoder strip adapted to read an encoder on a print head carriage supported on the top and bottom linear rails to detect the position of the print head carriage on the X-arm carriage, a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support a print head carriage on the X-arm carriage along a y-axis, a longitudinal slot formed within the magnet frame between the top linear rail and the bottom linear rail, and a linear motor magnet track mounted onto the second side of the magnet frame in alignment with the longitudinal slot and extending longitudinally along the magnet frame, the linear motor magnet track is adapted to operationally engage a single sided linear motor of a print head carriage supported on the top and bottom linear rails.

According to another aspect, the linear motor magnet track includes a single magnet.

According to another aspect, the linear motor magnet track includes a plurality of magnets mounted adjacent one another to the second side of the magnet frame.

According to another aspect, the magnet frame, the top plate, the frame plate and the bottom plate are made from aluminum.

According to another aspect, the reinforcement insert is held in place by one of clamping to the rectangular shaped tube structure, bolting to the rectangular shaped tube structure, and friction between the reinforcement insert and the rectangular shaped tube structure.

According to another aspect, the reinforcement insert is made from one of a composite material and carbon fiber.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
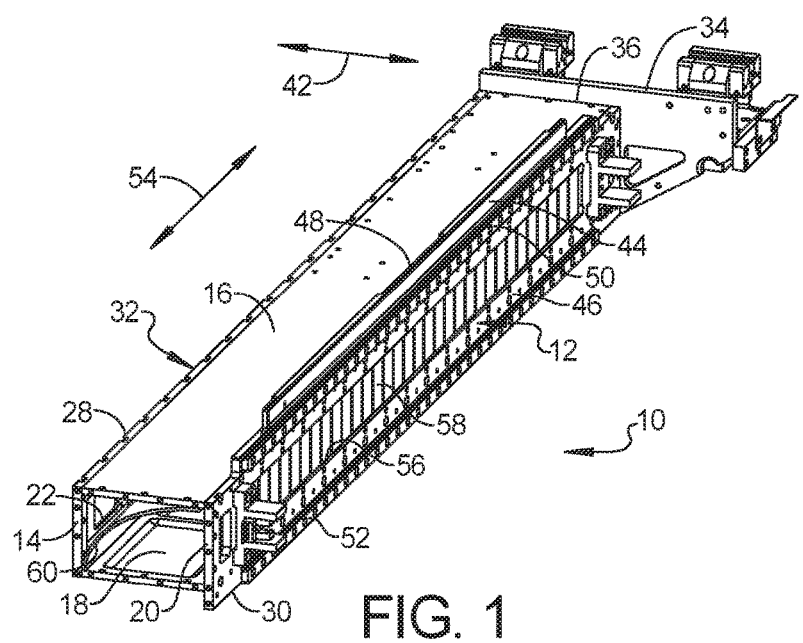
FIG. 1 is a perspective view of an X-carriage assembly according to an exemplary embodiment.
Figure 2:
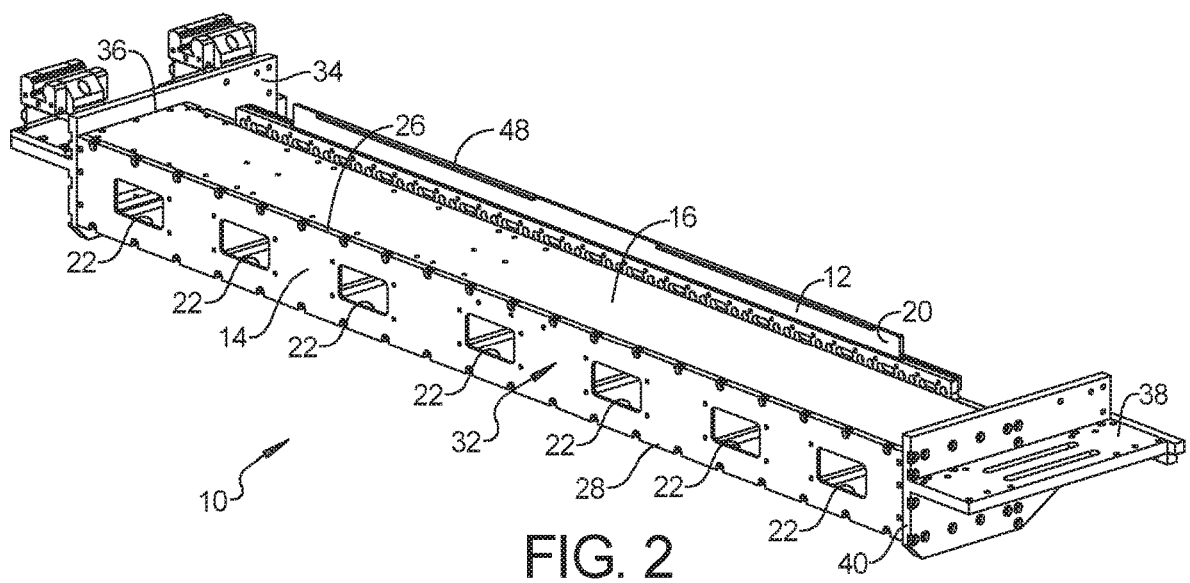
FIG. 2 is a perspective view of the X-carriage assembly shown in FIG. 1, wherein the X-carriage assembly is rotated relative to the orientation shown in FIG. 1.
Figure 3:
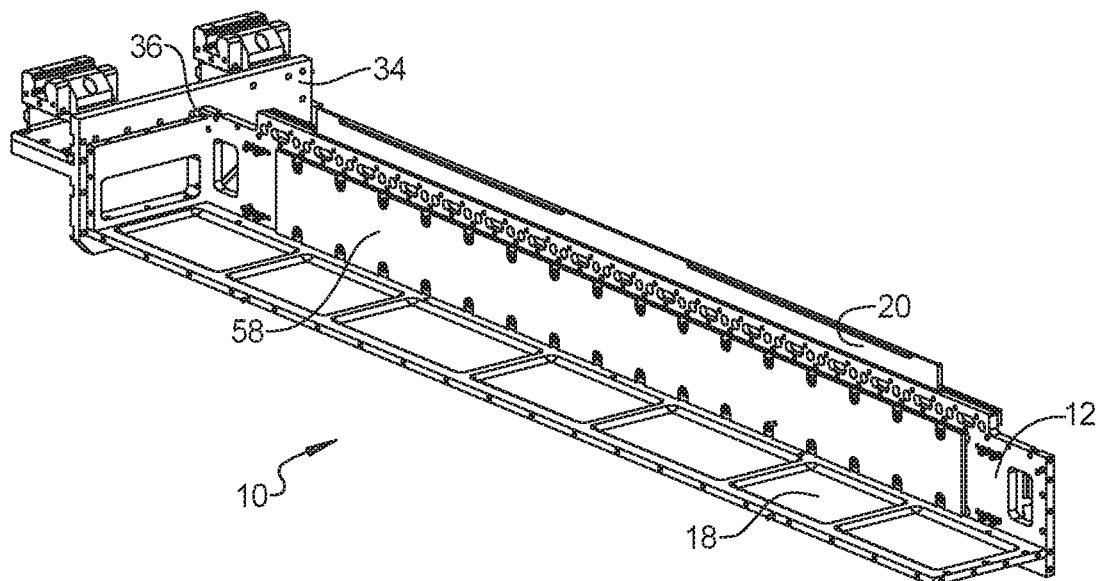
FIG. 3 is the perspective view shown in FIG. 2, wherein a top plate and a frame plate of the X-carriage assembly have been removed.

Referring to FIG. 1, FIG. 2 and FIG. 3, an X-arm carriage assembly 10 for an additive manufacturing machine includes a vertically oriented magnet frame 12, a frame plate 14, a top plate 16 and a bottom plate 18. The frame plate 14 is oriented vertically, parallel to and spaced from a second side 20 of the magnet frame 12. In an exemplary embodiment, the frame plate 14 includes a plurality of openings 22 formed therein. The top plate 16 extends horizontally between the magnet frame 12 and the frame plate 14, adjacent a top edge 26 of the frame plate 14. The bottom plate 18 extends horizontally between the magnet frame 12 and the frame plate 14, adjacent a bottom edge 28 of the frame plate 14 and a bottom edge 30 of the magnet frame 12, parallel to and spaced from the top plate 16.

The magnet frame 12, the top plate 16, the frame plate 14 and the bottom plate 18 define a rectangular shaped tube structure 32. The magnet frame 12, the top plate 16, the frame plate 14 and the bottom plate 18 may be fastened to one another by known means such as bolts, machine screws, rivets, welding, ultra-sonic welding, etc.

A first support bracket 34 is attached to a first distal end 36 of the rectangular shaped tube structure 32 and a second support bracket 38 is attached to a second distal end 40 of the rectangular shaped tube structure 32. The first and second support brackets 34, 38 are adapted to support the X-arm carriage assembly 10 within an additive manufacturing machine for movement within the additive manufacturing machine along an x-axis 42. In an exemplary embodiment, the first and second support brackets 34, 38 are supported on rails within the additive manufacturing machine. A mover, such as a servo motor or linear motor may act on one or both of the first and second support brackets 34, 38 to move the X-arm carriage assembly 10 back and forth within the additive manufacturing machine along the x-axis 42.

An encoder strip 44 is mounted onto a first side 46 of the magnet frame 12 adjacent a top edge 48 of the magnet frame 12. The encoder strip 44 extends longitudinally along the magnet frame 12. In an exemplary embodiment, the encoder strip 44 is integrated into the first side 46 of the magnet frame 12. Integration of an encoder strip 44 into the magnet frame 12 reduces mass and increases stiffness of the magnet frame 12.

A top linear rail 50 is mounted onto the first side 46 of the magnet frame 12 adjacent the encoder strip 44 and extends longitudinally along the magnet frame 12. A bottom linear rail 52 is mounted onto the first side 46 of the magnet frame 12 adjacent the bottom edge 30 of the magnet frame 12 and extends longitudinally along the magnet frame 12. The top linear rail 50 and the bottom linear rail 52 are adapted to moveably support a print head carriage on the X-arm carriage assembly 10 and allow the print head carriage to move back and forth between the first and second distal ends 36, 40 along a y-axis 54.

A longitudinal slot 56 is formed within the magnet frame 12 parallel to and between the top linear rail 50 and the bottom linear rail 52. The longitudinal slot 56 extends substantially the same length as the top and bottom linear rails 50, 52. A linear motor magnet track 58 is mounted onto the second side 20 of the magnet frame 12 in alignment with the longitudinal slot 56 and extending longitudinally along the magnet frame 12. The linear motor magnet track 58 is attached to the second side 20 of the magnet frame 12 by known means, such as bolts, machine screws, etc. The linear motor magnet track 58 substantially covers the longitudinal slot 56 formed within the magnet frame 12. In an exemplary embodiment, the linear motor magnet track 58 is a single magnet. A single piece linear motor magnet track 58 provides substantial additional stiffness for the magnet frame 12 and the X-arm carriage assembly 10. In another exemplary embodiment, the linear motor magnet track 58 includes a plurality of magnets mounted adjacent one another.

An important aspect of the X-arm carriage assembly 10 is stiffness. Stiffness of the X-arm carriage assembly 10 ensures that the position of the print head can be accurately and precisely controlled during creation of a three dimensional part created with the additive manufacturing machine. The rectangular shaped tube structure 32 of the X-arm carriage assembly 10 provides stiffness. The magnet frame 12, the top plate 16, the frame plate 14 and the bottom plate 18 may be made from any suitable material that provides strength and stiffness characteristics adequate for the application. In an exemplary embodiment, the magnet frame 12, the top plate 16, the frame plate 14 and the bottom plate 18 are made from aluminum. The improved structural characteristics of the X-arm carriage assembly 10 allows material to be removed, such as the openings 22 formed within the frame plate 14, to reduce mass.

Figure 4:
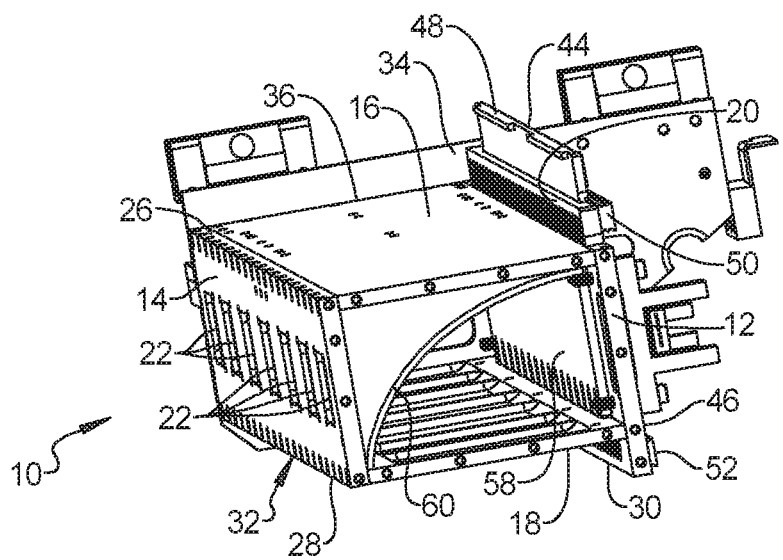
FIG. 4 is an end view of the X-carriage assembly shown in FIG. 1, wherein a second support bracket is removed.

Referring to FIG. 4, an end view of the X-arm carriage assembly 10 is shown with the second support bracket 38 removed. In an exemplary embodiment, the X-arm carriage assembly 10 includes a reinforcement insert 60 positioned within the rectangular shaped tube structure 32 defined by the magnet frame 12, the top plate 16, the frame plate 14 and the bottom plate 18. The reinforcement insert 60 provides additional structural support within the rectangular shaped tube structure 32 to provide added stiffness. The reinforcement insert 60 may be held in place by friction between the reinforcement insert 60 and the magnet frame 12, the top plate 16, the frame plate 14 and the bottom plate 18. Alternatively, the reinforcement insert 60 is held in place by one of clamping or bolting to the rectangular shaped tube structure 32 defined by the magnet frame 12, the top plate 16, the frame plate 14 and the bottom plate 18.

For improved weight and stiffness characteristics, the reinforcement insert 60 is made from a composite material or carbon fiber, which will provide added stiffness without adding much weight to the X-arm carriage assembly 10.

The linear motor magnet track 58 is adapted to operationally engage a single sided linear motor of a print head carriage supported on the top and bottom linear rails 50, 52. The encoder strip 44 is adapted to read an encoder on the print head carriage supported on the top and bottom linear rails 50, 52 to detect the position of the print head carriage on the X-arm carriage assembly 10. The single sided linear motor moves the print head carriage back and forth on the top and bottom linear rails 50, 52 along the y-axis 54. The encoder strip 44 allows the additive manufacturing machine to locate the print head carrier accurately along the X-arm carriage assembly 10.

An X-arm carriage assembly 10 of the present disclosure offers several advantages. These include improved stiffness and mass reduction. The X-arm carriage assembly 10 of the present disclosure may be incorporated with a new additive manufacturing machine, or may be retro-fitted to improve performance of an existing additive manufacturing machine. In addition, the X-arm carriage assembly 10 of the present disclosure may be tuned for particular applications. The specific dimensions of the top plate 16, bottom plate 18, magnet frame 12 and frame plate 14, as well as strategic placement of openings 22 formed therein can be optimized for the loading characteristics of the X-arm carriage assembly 10 for a specific application.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An X-arm carriage assembly for an additive manufacturing machine, comprising:
   a vertically oriented magnet frame;
   a frame plate oriented vertically, parallel to and spaced from a second side of the magnet frame;
   a top plate extending horizontally between the magnet frame and the frame plate, adjacent a top edge of the frame plate;

a bottom plate extending horizontally between the magnet frame and the frame plate, adjacent a bottom edge of the frame plate, parallel to and spaced from the top plate;

a first support bracket attached to a first distal end of the magnet frame and a second support bracket attached to a second distal end of the magnet frame, the first and second support bracket adapted to support the X-arm carriage assembly within an additive manufacturing machine for movement within the additive manufacturing machine along an x-axis;

an encoder strip mounted onto a first side of the magnet frame adjacent a top edge of the magnet frame and extending longitudinally along the magnet frame;

a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support a print head carriage on the X-arm carriage assembly along a y-axis;

a longitudinal slot formed within the magnet frame between the top linear rail and the bottom linear rail; and a linear motor magnet track mounted onto the second side of the magnet frame in alignment with the longitudinal slot and extending longitudinally along the magnet frame.

2. The X-arm carriage assembly of claim 1, wherein the linear motor magnet track includes a single magnet.

3. The X-arm carriage assembly of claim 1, wherein the linear motor magnet track includes a plurality of magnets mounted adjacent one another to the second side of the magnet frame.

4. The X-arm carriage assembly of claim 1, wherein the magnet frame, the top plate, the frame plate and the bottom plate are made from aluminum.

5. The X-arm carriage assembly of claim 1, wherein the frame plate includes a plurality of openings formed therein.

6. The X-arm carriage assembly of claim 1, wherein the magnet frame, the top plate, the frame plate and the bottom plate define a rectangular shaped tube structure extending between the first and second support brackets.

7. The X-arm carriage assembly of claim 6, further including a reinforcement insert positioned within the rectangular shaped tube structure defined by the magnet frame, the top plate, the frame plate and the bottom plate.

8. The X-arm carriage assembly of claim 7, wherein the reinforcement insert is held in place by friction between the reinforcement insert and the magnet frame, the top plate, the frame plate and the bottom plate.

9. The X-arm carriage assembly of claim 7, wherein the reinforcement insert is held in place by one of clamping or bolting to the rectangular shaped tube structure defined by the magnet frame, the top plate, the frame plate and the bottom plate.

10. The X-arm carriage assembly of claim 7, wherein the reinforcement insert is made from a composite material.

11. The X-arm carriage assembly of claim 7, wherein the reinforcement insert is made from carbon fiber.

12. The X-arm carriage assembly of claim 1, wherein the linear motor magnet track is adapted to operationally engage a single sided linear motor of a print head carriage supported on the top and bottom linear rails.

13. The X-arm carriage assembly of claim 12, wherein the encoder strip is adapted to read an encoder on a print head carriage supported on the top and bottom linear rails to detect the position of the print head carriage on the X-arm carriage assembly.

14. An X-arm carriage assembly for an additive manufacturing machine, comprising:

a vertically oriented magnet frame;

a frame plate oriented vertically, parallel to and spaced from a second side of the magnet frame and including a plurality of openings formed therein;

a top plate extending horizontally between the magnet frame and the frame plate, adjacent a top edge of the frame plate;

a bottom plate extending horizontally between the magnet frame and the frame plate, adjacent a bottom edge of the frame plate, parallel to and spaced from the top plate, the magnet frame, the top plate, the frame plate and a bottom plate defining a rectangular shaped tube structure;

a first support bracket attached to a first distal end of the rectangular shaped tube structure and a second support bracket attached to a second distal end of the rectangular shaped tube structure, the first and second support bracket adapted to support the X-arm carriage assembly within an additive manufacturing machine for movement within the additive manufacturing machine along an x-axis;

an encoder strip mounted onto a first side of the magnet frame adjacent a top edge of the magnet frame and extending longitudinally along the magnet frame;

a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support a print head carriage on the X-arm carriage assembly along a y-axis;

a longitudinal slot formed within the magnet frame between the top linear rail and the bottom linear rail; and a linear motor magnet track mounted onto the second side of the magnet frame in alignment with the longitudinal slot and extending longitudinally along the magnet frame, the linear motor magnet track including one of a single magnet and a plurality of magnets mounted adjacent one another.

15. The X-arm carriage assembly of claim 14, wherein the magnet frame, the top plate, the frame plate and the bottom plate are made from aluminum.

16. The X-arm carriage assembly of claim 14, further including a reinforcement insert positioned within the rectangular shaped tube structure defined by the magnet frame, the top plate, the frame plate and the bottom plate.

17. The X-arm carriage assembly of claim 16, wherein the reinforcement insert is held in place by friction between the reinforcement insert and the magnet frame, the top plate, the frame plate and the bottom plate.

18. The X-arm carriage assembly of claim 16, wherein the reinforcement insert is held in place by one of clamping or bolting to the rectangular shaped tube structure defined by the magnet frame, the top plate, the frame plate and the bottom plate.

19. The X-arm carriage assembly of claim 16, wherein the reinforcement insert is made from a composite material.

20. The X-arm carriage assembly of claim 16, wherein the reinforcement insert is made from carbon fiber.

21. The X-arm carriage assembly of claim 14, wherein the linear motor magnet track is adapted to operationally engage a single sided linear motor of a print head carriage supported on the top and bottom linear rails and the encoder strip is adapted to read an encoder on the print head carriage supported on the top and bottom linear rails to detect the position of the print head carriage on the X-arm carriage assembly.

22. An X-arm carriage assembly for an additive manufacturing machine, comprising:
- a vertically oriented magnet frame;
- a frame plate oriented vertically, parallel to and spaced from a second side of the magnet frame and including a plurality of openings formed therein;
- a top plate extending horizontally between the magnet frame and the frame plate, adjacent a top edge of the frame plate;
- a bottom plate extending horizontally between the magnet frame and the frame plate, adjacent a bottom edge of the frame plate, parallel to and spaced from the top plate, the magnet frame, the top plate, the frame plate and the bottom plate defining a rectangular shaped tube structure;
- a reinforcement insert positioned within the rectangular shaped tube structure;
- a first support bracket attached to a first distal end of the rectangular shaped tube structure and a second support bracket attached to a second distal end of the rectangular shaped tube structure, the first and second support bracket adapted to support the X-arm carriage assembly within an additive manufacturing machine for movement within the additive manufacturing machine along an x-axis;
- an encoder strip mounted onto a first side of the magnet frame adjacent a top edge of the magnet frame and extending longitudinally along the magnet frame, the encoder strip adapted to read an encoder on a print head carriage to detect the position of the print head carriage on the X-arm carriage assembly;
- a top linear rail mounted onto the first side of the magnet frame adjacent the encoder strip and extending longitudinally along the magnet frame, and a bottom linear rail mounted onto the first side of the magnet frame adjacent a bottom edge of the magnet frame, the top linear rail and the bottom linear rail adapted to moveably support the print head carriage on the X-arm carriage along a y-axis;
- a longitudinal slot formed within the magnet frame between the top linear rail and the bottom linear rail; and
- a linear motor magnet track mounted onto the second side of the magnet frame in alignment with the longitudinal slot and extending longitudinally along the magnet frame, the linear motor magnet track is adapted to operationally engage a single sided linear motor of a print head carriage supported on the top and bottom linear rails.

23. The X-arm carriage assembly of claim 22, wherein the linear motor magnet track includes a single magnet.

24. The X-arm carriage assembly of claim 22, wherein the linear motor magnet track includes a plurality of magnets mounted adjacent one another to the second side of the magnet frame.

25. The X-arm carriage assembly of claim 22, wherein the magnet frame, the top plate, the frame plate and the bottom plate are made from aluminum.

26. The X-arm carriage assembly of claim 22, wherein the reinforcement insert is held in place by one of clamping to the rectangular shaped tube structure, bolting to the rectangular shaped tube structure, and friction between the reinforcement insert and the rectangular shaped tube structure.

27. The X-arm carriage assembly of claim 22, wherein the reinforcement insert is made from one of a composite material and carbon fiber.

* * * * *